United States Patent

Russey

[11] 3,841,431
[45] Oct. 15, 1974

[54] INSTRUMENT PANEL GUARD
[75] Inventor: James W. Russey, Decatur, Ill.
[73] Assignee: Caterpillar Tractor Co., Peoria, Ill.
[22] Filed: May 2, 1973
[21] Appl. No.: 356,327

[52] U.S. Cl.............................. 180/90, 160/132
[51] Int. Cl............................................ B60k 37/00
[58] Field of Search....... 180/90; 160/132; 312/284; 317/120

[56] References Cited
UNITED STATES PATENTS
2,250,729  7/1941  Smith.................................. 160/132
2,811,458  10/1957  Suyak.................................. 160/132
2,970,005  1/1961  Schillinger........................ 321/284
3,452,835  7/1969  Deli..................................... 180/90

Primary Examiner—Robert R. Song
Attorney, Agent, or Firm—Ralph E. Walters

[57] ABSTRACT

An instrument panel guard includes a cover device pivotally connected externally to an instrument console for pivotal movement between a closed protective overlying position covering the instruments mounted on an instrument panel of the instrument console to prevent vandalism thereto and a compact noninterfering open position whereby the instruments are readily observable and accessible.

7 Claims, 6 Drawing Figures

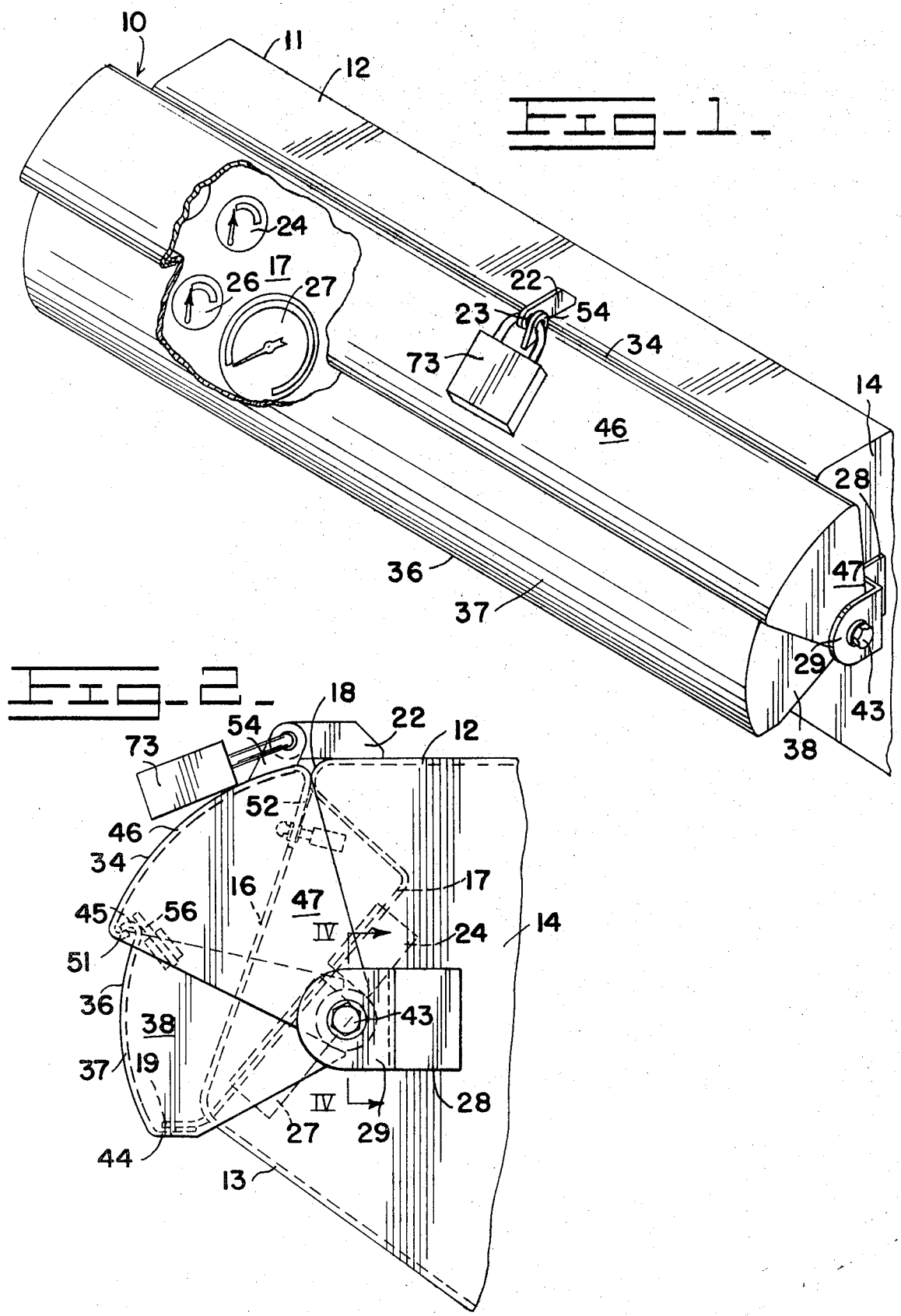

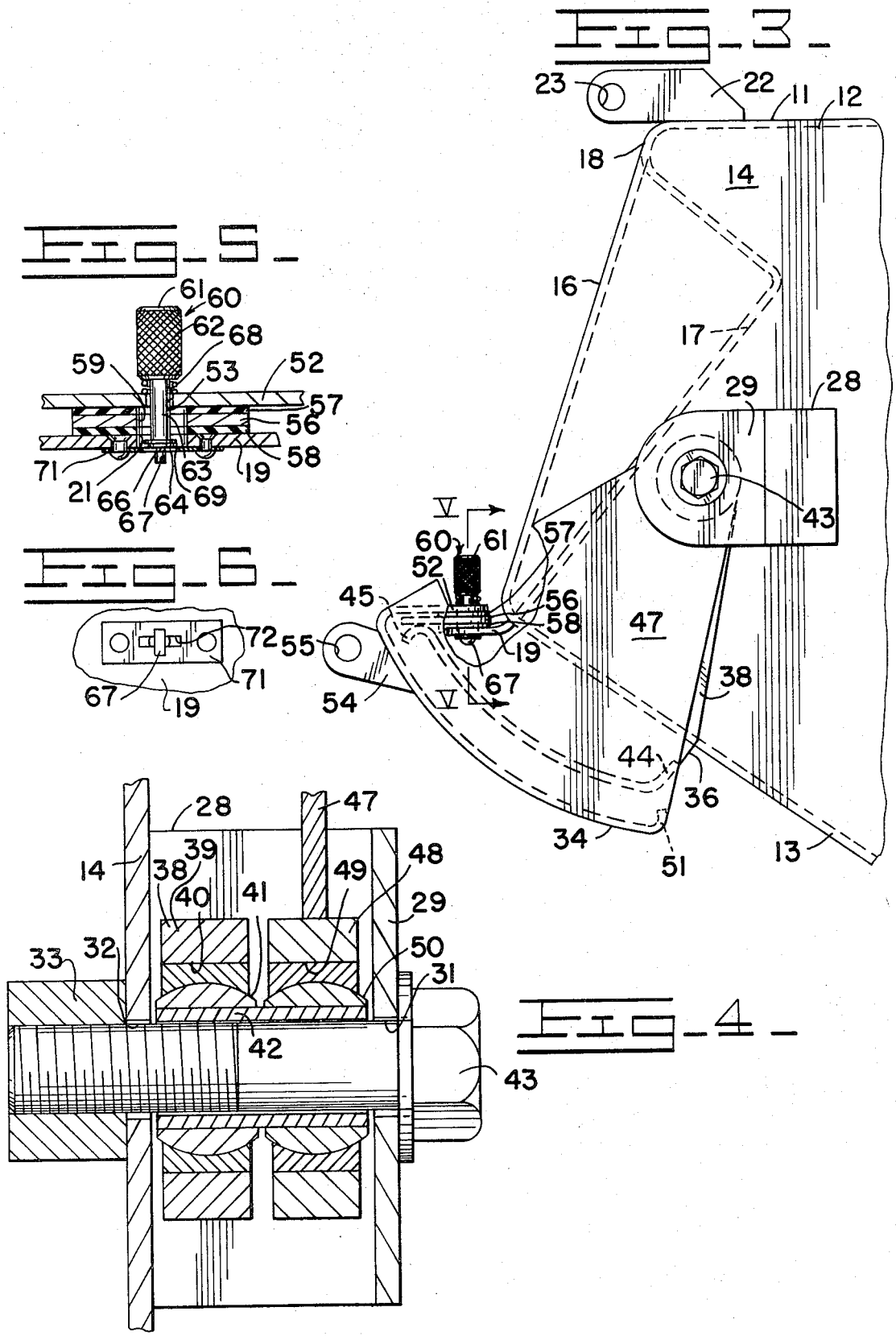

INSTRUMENT PANEL GUARD

BACKGROUND OF THE INVENTION

Many industrial vehicles have operators compartments which do not provide lock mechanisms and which in many cases are completely open. Such vehicles are commonly left unattended at the job site between work periods and are often subjected to incidents of vandalism such as breakage of instruments, gauges, switches, etc. Repairs to the instruments are costly and timeconsuming and result in nonproductive vehicle down time since the vehicles cannot be safely operated without them. Although several types of vandalism covers for instrument panels are available, such covers are commonly constructed of fibreglass or lightweight sheet metal which can be easily distorted to gain access to the instruments. Also, many of such covers are bulky and must be removed from the instrument panel and stored remotely therefrom during periods of nonuse to avoid interfering with the operator and the operation or manipulation of other vehicle components and controls.

OBJECTS OF THE INVENTION

Accordingly, an object of this invention is to provide an improved instrument panel guard for an instrument console.

Another object of this invention is to provide such an improved instrument panel guard which is capable of withstanding considerable abuse and which is substantially selfstoring when not in use.

Another object of this invention is to provide an improved instrument panel guard of the character described which is effective fully to enclose and dependably to protect the instruments mounted on an instrument panel to discourage unauthorized access and damage thereto vandalism and is conveniently manipulatable to a compact noninterfering stored position permitting normal viewing of and access to the instruments.

Other objects and advantages of the present invention will become more readily apparent upon reference to the accompanying drawings and following description.

BRIEF DESCRIPTION OF THE DRAWINGS

FIG. 1 is a perspective view of an instrument panel guard embodying principles of the present invention in association with an instrument console.

FIG. 2 is a side elevational view of the instrument panel guard of FIG. 1 shown in a closed instrument covering position.

FIG. 3 is a side elevational view of the instrument panel guard shown in a stored position when not in use.

FIG. 4 is a sectional view taken along line IV—IV of FIG. 2.

FIG. 5 is a sectional view taken along line V—V of FIG. 3.

FIG. 6 is a bottom plan view of the latching mechanism of FIG. 5.

DESCRIPTION OF THE PREFERRED EMBODIMENT

Referring more particularly to the drawings, an instrument panel guard embodying the principles of the present invention is generally indicated by the reference numeral 10 in association with an instrument console partially shown at 11. The instrument console is a generally hollow housing formed by a top wall 12 and a bottom wall 13, both of which have their opposite ends joined to a pair of substantially parallel sidewalls, one of which is shown at 14. A substantially vertical end wall 16 extends between the top and bottom walls and between the sidewalls. An instrument panel 17 is recessed within the end wall 16 forming a top flange 18 between the end wall and top wall. A lower edge 19 of the instrument panel extends generally horizontally outwardly from the end wall and has an aperture 21 extending therethrough as best shown in FIG. 5. An upstanding lug 22 having an aperture 23 extending therethrough is secured to the top wall 12 intermediate the sidewalls with the apertured end extending outwardly beyond the flange 18. A plurality of instruments, or gauges, some of which are shown at 24, 26 and 27, are suitably mounted in the instrument panel.

A pair of mounting brackets, one of which is shown at 28, are individually secured to the sidewalls 14. Each bracket has a flange portion 29 laterally spaced from and disposed substantially parallel to the respective sidewall. As best shown in FIG. 4, an aperture 31 is provided in the flange portion in axial alignment with an aperture 32 formed in the sidewall and with a nut 33 secured to the inner surface of the sidewall as by welding or the like.

The instrument panel guard 10 includes a pair of hinged upper outer and lower inner cover sections 34 and 36, respectively, capable of relative movement to a retractably overlapping stored position shown in FIG. 3 permitting unrestricted visual inspection of the instrument panel 17. The lower inner cover section includes an elongated curved plate 37 transversely disposed relative to the instrument housing 11. A pair of arms, one of which is shown at 38, are individually secured to the ends of the plate. A bearing ring 39 is secured to the distal end of arm and, as more clearly shown in FIG. 4, has a bore 40 provided therein which receives a spherical bearing assembly 41. The bearing assembly is rotatably mounted on a sleeve 42 disposed between the sidewall 14 and the flange portion 29 of the bracket 28. A bolt 43 extends through the sleeve, as well as the apertures 31 and 32 of the flange portion and sidewall, respectively, and is screw-threadably secured to the nut 33. The lower edge of the plate is provided with an inwardly directed lip 44 while the upper edge is rolled outwardly to form a hook 45. The plate is curved on the arc of a circle having its axis coaxial with the bore 40.

Similarly, the upper outer cover section 34 includes a curved plate 46 which in the retracted open position, as shown in FIG. 3, is disposed in concentrically spaced relation to the curved plate 37 of the lower cover section 36. The curved plate 46 is slightly longer than the curved plate 37 and has a pair of arms, one of which is shown at 47, individually secured to its ends. Each arm 47 is spaced outwardly from and substantially parallel to its respectively adjacent arm 38 of the lower cover section 36. A bearing ring 48 is secured to the distal end of each arm and, as more clearly shown in FIG. 4, is provided with a bore 49 which receives a spherical bearing assembly 50. The bearing assembly is rotatably mounted on the sleeve 42 and is spaced axially outwardly from the bearing assembly 41.

The lower edge of the plate 46 of the upper cover section 34 is rolled inwardly to form a hook 51 which is adapted for interlocking engagement with the hook 45 of the curved plate 37. The upper edge of the plate 46 is turned inwardly to form a full width flange 52 which is substantially parallel to the lower edge 19 of the instrument panel 17 when the instrument panel guard 10 is in the retracted position of FIG. 3. An aperture 53 extends through the flange intermediate the arms 47. A locking lug 54 having an aperture 55 extending therethrough is secured to the outer surface of the plate 46 adjacent to the flange. As more clearly shown in FIGS. 1 and 2, the lug is positioned so that it is adjacent to the lug 22 when the guard 10 is in the closed position of FIG. 1.

A tab 56 is secured to the hook 45 of the plate 37 and extends inwardly therefrom. With the instrument panel guard 10 in its retracted position, the tab is substantially parallel to the lower edge 19 of the instrument panel 17. A pair of resilient pads 57 and 58 are individually secured to the top and bottom surfaces, respectively, of the tab. A hole 59 extends through the tab 56 and the pads.

As more clearly shown in FIGS. 3 and 5, a locking mechanism 60 is employed to releasably retain the instrument panel guard 10 in its retracted position of FIG. 3 and includes a cylindrical latch member 61. The latch member has a knurled portion 62 formed on one end and a shank 63 formed on the opposite end. An annular flange 64 is formed on the shank adjacent to a reduced diameter portion 66 which terminates in a spade-like portion 67. The shank slidably extends through the aperture 53 in the flange 52 of the plate 46 with a spring 68 disposed between the knurled portion and the flange 52. A retaining ring 69 is slidably disposed on the shank between the annular flange 64 and the flange 52 to retain the latch member upon the flange 52.

An elongated plate 71 having an elongated slot 72 provided therein is riveted or otherwise suitably secured to the bottom side of the lower edge 19 of the instrument panel 17 with the slot 72 aligned with the aperture 21.

Operation

While the operation of the present invention is believed clearly apparent from the foregoing description, further amplification will subsequently be made in the following brief summary of such operation. When the instrument panel cover is not in use, it is stored in its retracted position of FIG. 3. In such position, the cover sections 34 and 36 are disposed adjacent to and in generally parallel relation to the bottom wall 13 with the lower cover section being compactly nested within the upper cover section. The pad 58 secured to the tab 56 is supported upon the lower edge 19 of the instrument panel 17 to limit any further downward movement of the cover sections. The flange 52 of the upper cover sections 34 is supported upon the pad 57 of the tab 56. To retain the cover sections in the retracted position, the spade-like portion 67 of the latch member 61 is inserted through the elongated slot 72 and the latch member rotated 90° so that the spade-like portion is normal to the elongated slot.

To block access to the instruments mounted on the instrument panel 17, the latching mechanism 60 is released by rotating the latch member 61 90° and the upper cover 34 is manually pivoted upwardly about the sleeves 42 and bolts 43. In so doing, the hook 51 of the cover interlockingly engages the hook 45 of the lower cover section 36 causing it to be pivoted and carried upwardly in protective overlying shielding relation to the instruments. When the flange 52 of the upper cover section is positioned adjacent to the top flange 18, the instrument panal guard 10 is secured in such closed position with a padlock 73 which is inserted through apertures 23 and 55 of the lugs 22 and 54, respectively. The lip 44 of the lower cover section is arranged for contact with the lower edge 19 of the instrument panel 17 to limit further upward pivotal movement of the cover sections relative to the console 11.

In view of the foregoing, it is readily apparent that the structure of the present invention provides an improved instrument panel guard which is normally disposed in a compact nested noninterfering self-storing position below the instrument console when it is desirable to view the instruments and which can be conveniently pivoted to a position fully enclosing the instruments in dependably shielded relation when they are not in use to discourage unauthorized access and damage thereto by vandals. The flange 52 of the upper cover section and the lip 44 of the lower cover section, as well as the interlocked hooks 45 and 51 inherently increase the structural rigidity of the guard.

While the invention has been described and shown with particular reference to the preferred embodiment, it will be apparent that variations might be possible that would fall within the scope of the present invention which is not intended to be limited except as defined in the following claims.

What is claimed is:

1. An instrument panel guard for an instrument console having a plurality of instruments mounted on an instrument panel thereof comprising;
    cover means having opposite ends and a pair of arms individually secured to said ends, said cover means including a predetermined upper curved plate and a lower curved plate with each of said plates having upper and lower edges;
    pivot means operatively attaching said arms of said cover means externally to such instrument console for selective pivotal movement of said curved plates between a closed protective overlying position dependably enclosing such instruments and a retracted open position permitting unrestricted visual inspection of the instrument panel; and
    abutment means including an inwardly disposed hook formed along the lower edge of said upper plate and an outwardly disposed hook formed along the upper edge of said lower plate to permit limited relative movement of said curved plates to a nested overlapping retracted position with said inwardly disposed hook being engageable with said outwardly disposed hook to move the curved plates as a unit toward said closed position,
    said lower curved plate having an inwardly disposed flanged lip formed along the lower edge of said lower curved plate for abutment with the instrument console to limit the pivotal movement of said lower plate in said closed position.

2. The instrument panel guard of claim 1 wherein said curved plates are concentrically related for relative swinging movement about individual arcs having an axis coaxial with said pivot means.

3. The instrument panel guard of claim 2 including resilient stop means adapted for limiting the pivotal movement of said curved plates in said retracted position.

4. The instrument panel guard of claim 3 wherein said resilient stop means is secured to said lower curved plate for abutting engagement with the instrument console and disposed between the console and said upper curved plate.

5. The instrument panel guard of claim 4 including a latching mechanism releasably to retain said cover means in said retracted position.

6. The instrument panel guard of claim 5 including means for selectively locking said cover means in said closed position to discourage swinging of the cover means from said closed position.

7. The instrument panel guard of claim 6 wherein said pivot means includes bearing means associated with each of said arms of said cover means, and a bolt pivotally securing each of said bearing means to said instrument console.

* * * * *